United States Patent
Langer et al.

(10) Patent No.: US 10,327,025 B2
(45) Date of Patent: Jun. 18, 2019

(54) SYSTEMS, METHODS AND APPARATUS FOR MODIFYING OVER-THE-AIR CHANNELS FOR COAXIAL DISTRIBUTION

(71) Applicant: EchoStar Technologies L.L.C., Englewood, CO (US)

(72) Inventors: Paul Langer, Westminster, CO (US); Henry Gregg Martch, Parker, CO (US)

(73) Assignee: DISH TECHNOLOGIES L.L.C., Englewood, CO (US)

(*) Notice: Subject to any disclaimer, the term of this patent is extended or adjusted under 35 U.S.C. 154(b) by 0 days.

(21) Appl. No.: 14/964,939

(22) Filed: Dec. 10, 2015

(65) Prior Publication Data

US 2017/0171582 A1 Jun. 15, 2017

(51) Int. Cl.
| | |
|---|---|
| H04N 7/20 | (2006.01) |
| H04N 21/2665 | (2011.01) |
| H04N 21/2383 | (2011.01) |
| H04N 21/2385 | (2011.01) |
| H04N 21/438 | (2011.01) |
| H04N 21/2365 | (2011.01) |
| H04N 21/462 | (2011.01) |
| H04N 21/61 | (2011.01) |
| H04N 21/4363 | (2011.01) |

(52) U.S. Cl.
CPC ..... *H04N 21/2665* (2013.01); *H04N 21/2365* (2013.01); *H04N 21/2383* (2013.01); *H04N 21/2385* (2013.01); *H04N 21/4363* (2013.01); *H04N 21/4382* (2013.01); *H04N 21/4383* (2013.01); *H04N 21/4622* (2013.01); *H04N 21/6112* (2013.01); *H04N 21/6118* (2013.01); *H04N 21/6143* (2013.01)

(58) Field of Classification Search
CPC .......... H04N 21/6143; H04N 21/6122; H04N 21/4622; H04N 21/4383; H04N 21/4363; H04N 21/4382; H04N 21/2385; H04N 21/2383; H04N 21/2365; H04N 21/2665

See application file for complete search history.

(56) References Cited

U.S. PATENT DOCUMENTS

| | | | | |
|---|---|---|---|---|
| 6,526,576 B1 * | 2/2003 | Kwoh | ............... | H04N 5/44543 |
| | | | | 348/E5.105 |
| 6,634,027 B1 * | 10/2003 | Johnson | ............ | H04B 7/18523 |
| | | | | 348/E7.049 |
| 2002/0056140 A1 * | 5/2002 | Oishi | ..................... | H04H 20/26 |
| | | | | 725/148 |

(Continued)

*Primary Examiner* — Nasser M Goodarzi
*Assistant Examiner* — Patrick A Ryan
(74) *Attorney, Agent, or Firm* — Perkins Coie LLP

(57) ABSTRACT

Various embodiments of systems, apparatus, and methods are described for modifying over-the-air (OTA) channels for coaxial distribution. In one example, a method includes capturing at least one set of over the air (OTA) channels, each OTA channel being associated with a broadcast frequency within an OTA frequency spectrum; selecting a subset of OTA channels from the at least one set of OTA channels; translating the selected subset of OTA channels to a set of secondary frequencies within a secondary frequency spectrum; combining the translated subset of OTA channels and one or more satellite transponder signals into a coaxial feed; and transmitting the coaxial feed to a receiving device.

17 Claims, 11 Drawing Sheets

(56) References Cited

U.S. PATENT DOCUMENTS

| | | | | |
|---|---|---|---|---|
| 2004/0248517 | A1* | 12/2004 | Reichgott | H04B 7/022 455/63.4 |
| 2009/0172749 | A1 | 7/2009 | Martch | H04B 3/54 725/78 |
| 2009/0290659 | A1* | 11/2009 | Petrovic | H04H 20/30 375/340 |
| 2011/0105068 | A1* | 5/2011 | Reddy | H04B 1/0014 455/207 |
| 2013/0332967 | A1* | 12/2013 | Chang | H04H 40/90 725/68 |
| 2014/0317294 | A1* | 10/2014 | Ramesh | H04L 41/0896 709/226 |

\* cited by examiner

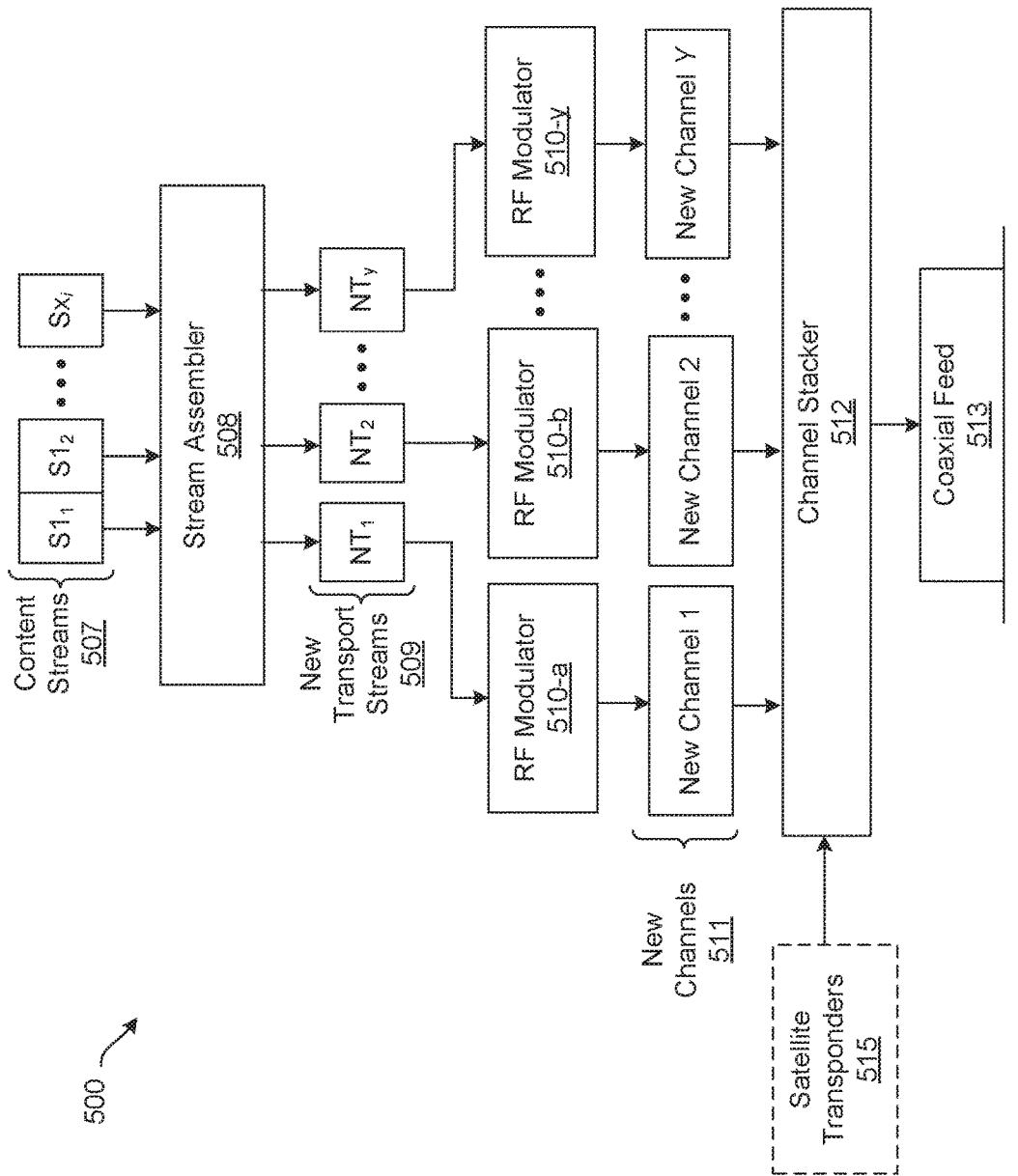

SYSTEMS, METHODS AND APPARATUS FOR MODIFYING OVER-THE-AIR CHANNELS FOR COAXIAL DISTRIBUTION

BACKGROUND

Expansion in television distribution services has led to a variety of television sources, including satellite, cable, Internet, and over-the-air (OTA) terrestrial broadcasting. Typically, each source is distributed to the interior of a building using coaxial cables that penetrate from the exterior of the building. Each source may be associated with a separate coaxial cable. A receiving device may be capable of receiving one or more of the sources.

The receiving device may include a set top box (STB) to receive satellite transmissions from a satellite television service provider. In some cases, the receiving device may also be configured to receive OTA terrestrial transmissions. Further, the STB may be configured to receive other data and/or programming transmitted via the Internet, such as through a phone line and/or wirelessly.

SUMMARY

The present disclosure relates to systems, methods, and apparatus for modifying OTA channels for distribution over a coaxial cable. In one implementation, a first method includes capturing at least one set of over the air (OTA) channels, each OTA channel being associated with a broadcast frequency within an OTA frequency spectrum; selecting a subset of OTA channels from the at least one set of OTA channels; translating the selected subset of OTA channels to a set of secondary frequencies within a secondary frequency spectrum; combining the translated subset of OTA channels and one or more satellite transponder signals into a coaxial feed; and transmitting the coaxial feed to a receiving device.

In some examples, translating the selected subset of OTA channels includes shifting the broadcast frequency of each selected OTA channel to its respective secondary frequency. In some examples, translating the selected subset of OTA channels includes demodulating each selected OTA channel; and modulating each demodulated OTA channel based on its respective secondary frequency.

In some examples, the secondary frequency spectrum has a bandwidth narrower than the OTA frequency spectrum. In some examples, the secondary frequency spectrum includes at least one satellite transponder frequency. The selected subset of OTA channels may be translated to the at least one satellite transponder frequency by employing satellite modulation.

In some examples, translating the selected subset of OTA channels includes demodulating each selected OTA channel; parsing one or more content streams from the selected subset of OTA channels; assembling at least one new transport stream from the one or more content streams; and modulating the at least one new transport stream based on its respective secondary frequency to generate at least one new channel.

In some examples, the first method further includes selecting the subset of OTA channels based at least in part on one or more active OTA tuners in the receiving device. In some examples, the first method further includes storing a correspondence between the broadcast frequency and the secondary frequency for each selected OTA channel. In some examples, the first method further includes measuring channel quality of the selected subset of OTA channels; and modifying at least one of antenna selection and antenna steering based on the measured channel quality.

In another implementation, a second method includes capturing at least one set of over the air (OTA) channels, each OTA channel being associated with a broadcast frequency within an OTA frequency spectrum; selecting a subset of OTA channels from the at least one set of OTA channels; demodulating each selected OTA channel; parsing one or more content streams from the selected subset of OTA channels; transmitting the one or more content streams to a receiving device as a Multimedia over Coax Alliance (MoCA) signal.

In some examples, the second method further includes parsing one or more satellite streams from a satellite transponder; combining the one or more content streams from the subset of OTA channels and the one or more satellite streams into a unified stream; and transmitting the unified stream as a MoCA signal to the receiving device.

In another implementation, an OTA receiving system includes a capture module for capturing at least one set of OTA channels, each OTA channel being associated with a broadcast frequency within an OTA frequency spectrum; a selection module for selecting a subset of OTA channels from the at least one set of OTA channels; a translation module for translating the selected subset of OTA channels to a set of secondary frequencies within a secondary frequency spectrum; a combiner module for combining the translated subset of OTA channels and one or more satellite transponder signals into a coaxial feed; and a communications module for transmitting the coaxial feed to a receiving device.

In some examples, translating the selected subset of OTA channels includes shifting the broadcast frequency of each selected OTA channel to its respective secondary frequency. In some examples, translating the selected subset of OTA channels includes demodulating each selected OTA channel; and modulating each demodulated OTA channel based on its respective secondary frequency.

In some examples, the secondary frequency spectrum has a bandwidth narrower than the OTA frequency spectrum. In some examples, the secondary frequency spectrum includes at least one satellite transponder frequency.

In some examples, translating the selected subset of OTA channels includes demodulating each selected OTA channel; parsing one or more content streams from the selected subset of OTA channels; assembling at least one new transport stream from the one or more content streams; and modulating the at least one new transport stream based on its respective secondary frequency to generate at least one new channel. The at least one new transport stream may be modulated using OTA channel modulation or using satellite transponder modulation.

In some examples, the selection module selects the subset of OTA channels based at least in part on one or more active OTA tuners in the receiving device. In some examples, the system further includes a storage unit for storing a correspondence between the broadcast frequency and the secondary frequency for each selected OTA channel. In some examples, the system further includes a measurement module for measuring channel quality of the selected subset of OTA channels; and an antenna control module for modifying at least one of antenna selection and antenna steering based on the measured channel quality.

It is to be understood that both the foregoing summary and the following detailed description are for purposes of example and explanation and do not necessarily limit the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The same number represents the same element or same type of element in all drawings.

FIG. 5B is a continuation of the example OTA receiver shown in FIG. 5A, according to one non-limiting illustrated embodiment.

DETAILED DESCRIPTION OF THE DRAWINGS

Figure 1:
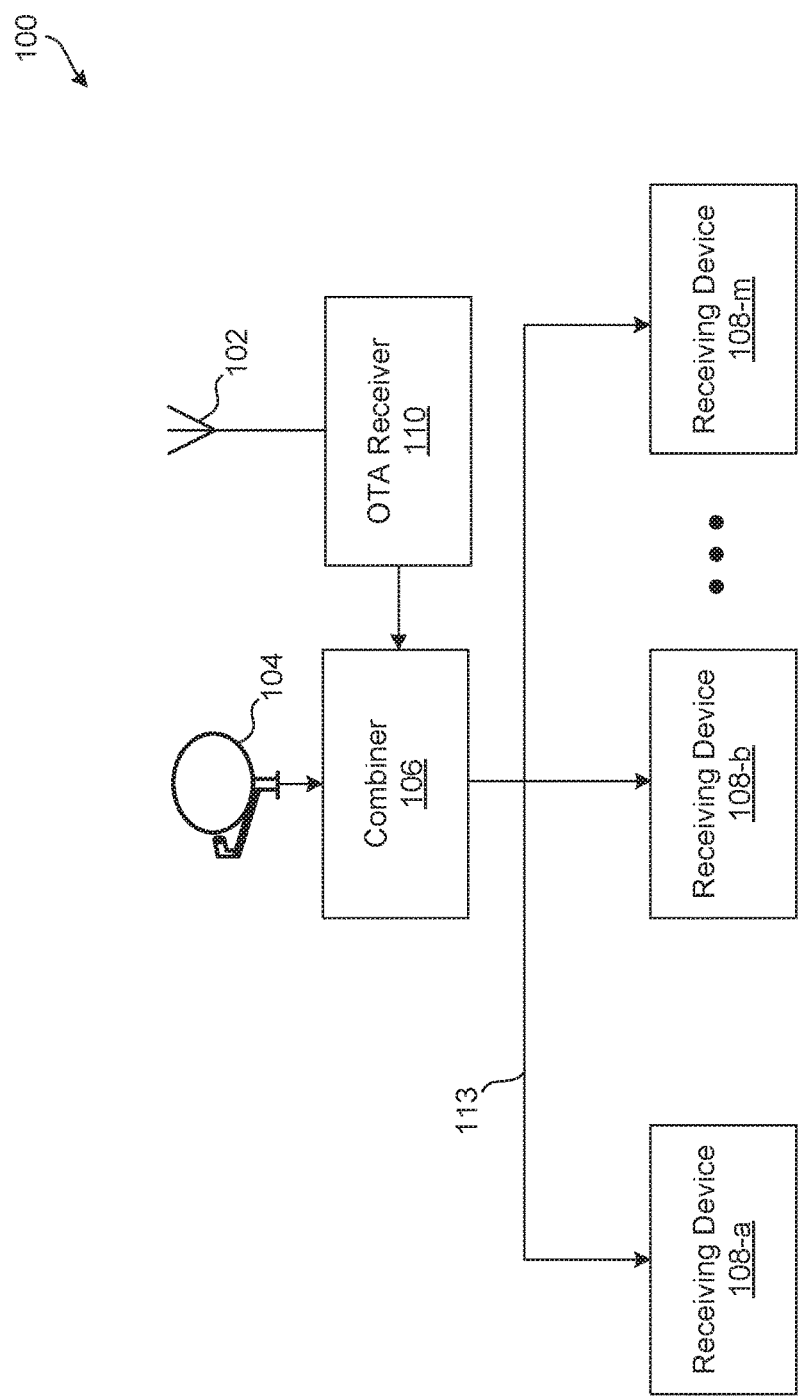
FIG. 1 is a block diagram of a television receiving system, according to one non-limiting illustrated embodiment.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with receiving, processing, and outputting signals have not been shown or described in detail to avoid unnecessarily obscuring descriptions of the embodiments.

Unless the context requires otherwise, throughout the specification and claims which follow, the word "comprise" and variations thereof, such as "comprises" and "comprising," are to be construed in an open, inclusive sense that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment.

The use of ordinals such as first, second and third does not necessarily imply a ranked sense of order, but rather may only distinguish between multiple instances of an act or structure.

The headings and Abstract of the Disclosure provided herein are for convenience only and do not interpret the scope or meaning of the embodiments.

The term "signal" may be any digital or analog signal. Those signals may include, but are not limited to, a bit, a specified set of bits, an AC signal, or a DC signal. Uses of the term "signal" in the description may include any of these different interpretations. It will also be understood to one skilled in the art that the term "connected" is not limited to a physical connection but can refer to any means of communicatively or operatively coupling two devices.

The disclosure uses the terms "television converter," "receiver," "set-top box," "receiving device," "television receiver," "television recording device," "set-top box (STB)", "satellite set-top box," "satellite receiver," "cable set-top box," "cable receiver," and "television tuner" to refer interchangeably to a converter device or electronic equipment that has the capacity to acquire, process and distribute one or more signals transmitted by broadcast, cable, telephone, or satellite distributors. DVR and "personal video recorder (PVR)" refer interchangeably to devices that can record and play back signals and that may implement trick functions including, but not limited to, fast-forward, rewind and pause. DVR and PVR functionality or devices may be combined with a television converter. The signals transmitted by these broadcast, cable, telephone or satellite distributors may include, individually or in any combination, internet, radio, television or telephonic data or information. One skilled in the art will recognize that a television converter device may be implemented as an external self-enclosed unit, a plurality of external self-enclosed units or as an internal unit housed within a television. One skilled in the art will recognize that the present invention can apply to analog and digital satellite set-top boxes.

The term "television" refers to a television set or video display that may contain an integrated television converter device (e.g., an internal cable-ready television tuner housed inside a television) or, alternatively, that is connected to an external television converter device (e.g., an external set-top box connected via cabling to a television).

The term "transponder" is used herein to denote a particular carrier frequency or "sub-band" which can be tuned to by an appropriate tuner. In particular, note that "transponder" does not refer to a single program/content service (e.g., CNN®, HBO®, CSPAN®). Similarly, "tuning" herein refers to receiving a transponder (as previously defined) or an over-the-air (OTA) broadcast television channel. The transponder or OTA channel may have multiple services thereon.

As a general matter, it should also be understood that satellite signals may be very different from broadcast television or other types of signals. Satellite signals may include multiplexed, packetized, and modulated digital signals. Once multiplexed, packetized and modulated, one satellite transmission may carry digital data representing several television stations or service providers and may include many transponders. Some examples of service providers include HBO®, CSPAN®, ABC®, CBS®, or ESPN®.

FIG. 1 is a block diagram of a television receiving system 100, according to one non-limiting illustrated embodiment.

Satellites may broadcast streams of audio/video/data (herein more simply termed the "video streams") as downlink satellite feeds to a receiving antenna 104. The satellites may each have a number of transponders, each having an assigned frequency sub-band that is typically used to downlink a transport stream as part of the respective satellite feeds. It should be noted that video streams for a plurality of services (e.g., CNN®, HBO®, CSPAN®) may be transmitted by a single transponder. As set forth in the one example embodiment, many frequency sub-bands corresponding to many transponders may be transmitted as part of each satellite feed. In many embodiments, satellites may provide different or substantially different programming services.

The receiving antenna 104 includes one or more low-noise frequency block downconverter with integrated feedhorns (LNBFs) that takes one or more of the satellite feeds, separates the received signals, and then processes them independently and simultaneously, translating the frequency of the received signals to a lower frequency more suitable for transmission as a coaxial feed 113 to receiving devices 108a-108m. In some examples, the coaxial feed 113 may be the only connection between the receiving antenna 104 and the receiving devices 108a-108m. The receiving antenna 104 may be pointed and electronically configured so as to receive broadcasts from one or more satellites simultaneously.

The receiving antenna may include a combiner 106 that combines one or more transponder signals from the receiving antenna 104 with signals from an over-the-air (OTA) receiver 110. Alternatively, in some embodiments, the combiner 106 may be a component of the receiving devices 108a-108m, a component of the OTA receiver 110, or a standalone device. The combiner 106 may allow for a single coaxial cable penetration to the interior of a building.

The OTA receiver 110 receives OTA broadcast television signals using one or more OTA antennas 102. The OTA antennas 102 may be controllable by the OTA receiver 110. For example, the OTA receiver 110 may select certain antennas 102 to receive an OTA signal, and/or steer certain antennas 102 to improve the quality of received signals. The received OTA signals may include a set of OTA channels carrying one or more video streams. The video streams may be digital television (DTV) streams. Each OTA channel may correspond to a broadcast frequency within an OTA frequency spectrum.

The OTA receiver 110 selects a subset of the OTA channels that are relevant to a particular receiving device or user, and modifies the frequency spectrum used by the selected OTA channels. The OTA channels may be selected based on which OTA channels are being tuned to by one or more of the receiving devices 108a-108m. Alternatively or in addition, the OTA channels may be selected based on a user's viewing history or other user preferences. By modifying the frequency spectrum of the selected OTA channels, the OTA receiver 110 allows the selected OTA channels to be more efficiently combined with the transponder signals from the receiving antenna 104 for transmission on the coaxial feed 113. For example, the frequency spectrum of the selected OTA channels may be narrowed to reduce or eliminate overlap with one or frequency sub-bands used to carry the satellite transponder signals on the coaxial feed 113.

In some embodiments, the combiner 106 may combine the selected OTA channels from the OTA receiver 110 and the transponder signals from the receiving antenna 104 by adding the signals to a channel stack. The channel stack may then be transmitted as a coaxial feed 113 to the receiving devices 108a-108m. Techniques for adding signals to a channel stack are described in U.S. application Ser. No. 13/558,175, filed Jul. 25, 2012, which is incorporated by reference herein in its entirety.

In order to process the streams included in the coaxial feed 113, each receiving device 108a-108m tunes a transponder or an OTA channel from the coaxial feed 113, demodulates the signal, demultiplexes out a desired video stream, decompresses it from MPEG-4 (e.g., from H.264/MPEG-4 Part 10 or "Advanced Video Coding" (AVC)) or other compression format (e.g., MPEG-2, H.263, VC-1, VC-2 (Dirac), Windows Media Video (WMV), RealVideo, Theora, TrueMotion VP3, etc.) and reformats it into the appropriate video specification (e.g., National Television Standards Committee (NTSC), Phase Alternate Lines (PAL), and High-Definition Multimedia Interface (HDMI), etc.). Each receiving device 108a-108m may then output a video signal, as appropriate, to a display device or other devices.

Alternatively, the combiner 106 and/or OTA receiver 110 may process video streams from the selected OTA channels and convert the video streams into Multimedia over Coax Alliance (MoCA) signals. The MoCA signals may then be combined with the transponder signals from the receiving antenna and transmitted over the coaxial feed 113.

The receiving devices 108a-108m include one or more tuner/demodulators that receive and process the coaxial feed 113. The tuner/demodulators may tune to the transponder signals and/or OTA channels from the coaxial feed 113. The tuner/demodulators of the receiving devices 108a-108m may initially process the coaxial feed 113 and also may receive user commands to tune to a transponder or OTA channel as part of the process of selecting a certain video stream for viewing on a display device. Such tuner/demodulators may include fewer, more, or different components. Alternatively or in addition, the receiving devices 108a-108m may include a communications module for receiving Multimedia over Coax Alliance (MoCA) signals from the coaxial feed 113. Video streams may then be decoded from the MoCA signals. Also, the receiving devices 108a-108m may perform other functions and be connected to fewer or more devices. One skilled in the art will recognize that many embodiments of the receiving devices 108a-108m are possible and within the scope of this disclosure.

Figure 2:
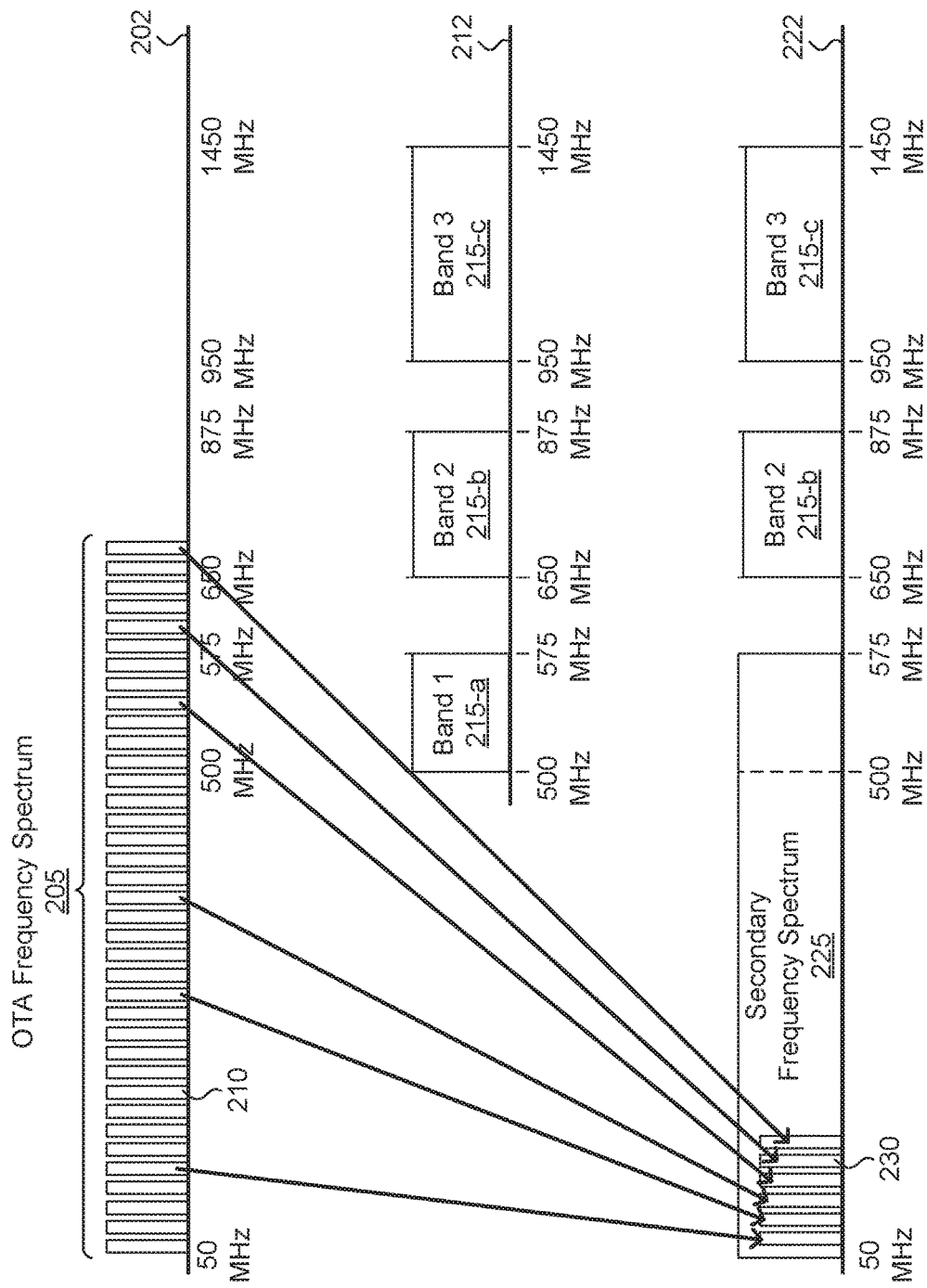
FIG. 2 is a diagram illustrating examples of frequency spectrums for audiovisual communication systems, according to one non-limiting embodiment.

FIG. 2 is a diagram illustrating examples of frequency spectrums for audiovisual communication systems. Spectrum line 202 illustrates an OTA frequency spectrum 205. OTA channels 210 correspond to broadcast frequencies within the OTA frequency spectrum 205. Spectrum line 212 illustrates a set of coaxial frequencies bands 215a-215c for carrying satellite transponder signals or other coaxial signals (such as MoCA signals). As shown in FIG. 2, a portion of the broadcast frequencies used for the OTA channels 210 may overlap with one or more of the coaxial frequency bands 215a-215c. This overlap may cause interference or decrease signal quality when the overlapping OTA channels 210 and coaxial signals are transmitted over a coaxial feed simultaneously.

Spectrum line 222 illustrates translated OTA channels 230 combined with the coaxial frequency bands 215a-215c. A subset of OTA channels 210 in the OTA frequency spectrum 205 are selected and then translated to a narrower secondary frequency spectrum 225, while preserving the original content stream information carried by the selected OTA channels 210. The secondary frequency spectrum 225 may overlap with fewer or none of the coaxial frequency bands 215a-215c, allowing the translated OTA channels 230 to share a single coaxial feed with satellite transponder signals or other coaxial signals.

Full band capture technology may be used to capture the OTA channels 210 in the OTA frequency spectrum 205. Specific OTA channels 210 in the captured OTA frequency spectrum 205 may then be selected and translated to the narrower secondary frequency spectrum 225. In some embodiments, the selected OTA channels 210 may be translated by digitally shifting the frequency of each selected OTA channel 210. In other embodiments, the selected OTA channels 210 may be translated by demodulated the selected OTA channel 210, then re-modulating each selected OTA channel 210 at a secondary frequency within the secondary frequency spectrum 225.

Figure 3:
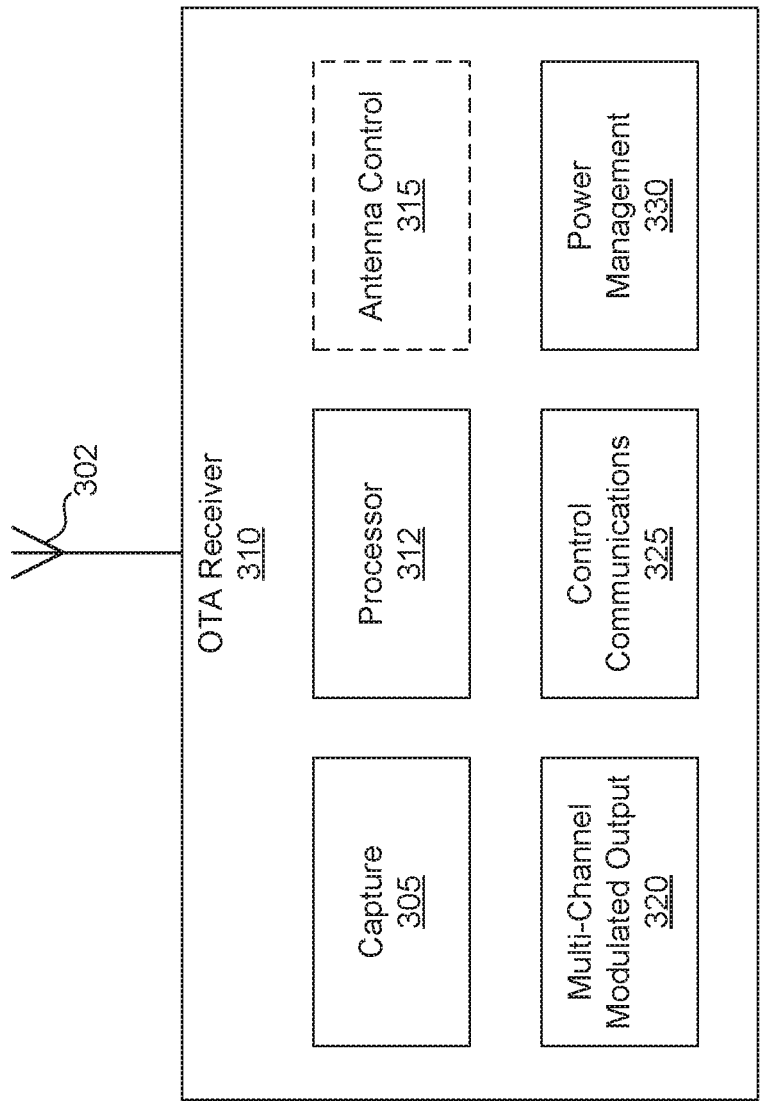
FIG. 3 is a diagram illustrating an example of an OTA receiver, according to one non-limiting embodiment.

FIG. 3 is a diagram illustrating an example of an OTA receiver 310. The OTA receiver 310 may be an example of the OTA receiver 110 described in reference to FIG. 1. The OTA receiver 310 may include one or more OTA antennas 302. The OTA receiver 310 may be a component of a satellite receiver antenna, a LNBF of a receiver antenna, or a receiving device. Alternatively, the OTA receiver may be a standalone component.

The OTA receiver 310 may include a capture module 305, a processor module 312, a multi-channel modulated output module 320, a control communications module 325, and a power management module 330.

The capture module 305 receives signals in the OTA frequency spectrum from the antenna 302 and captures the signals. The capture module 305 may perform analog to digital conversion of the entire OTA frequency spectrum. Alternatively, the capture module may utilize a bank of tuner/demodulators tuned to each frequency band of the OTA frequency spectrum. The processor module 312 may then select certain OTA channels from the captured OTA frequency spectrum. The OTA channels may be selected based on which OTA channels are being tuned to by one or more of the receiving devices. Alternatively or in addition, the OTA channels may be selected based on a user's viewing history or other user preferences. The processor module 312 may include a firmware and other memory to store the operations of the OTA receiver 310. The OTA channels that are to be selected by the processor module 312 may be communicated to the OTA receiver 310 from a receiving device through the control communications module 325. The control communications module 325 may receive control communications from a receiving device via a coaxial cable using protocols such as Digital Satellite Equipment Control (DiSEqC) or Frequency Shift Keying (FSK). In some embodiments, the firmware of the OTA receiver 310 may also be updated through communications received by the control communications module 325 via the coaxial cable.

Once the particular OTA channels are selected from the captured OTA frequency spectrum, the processor module 312 translates the selected OTA channels to a narrower secondary frequency spectrum. The processor module 312 may translate the selected OTA channels by digitally shifting the frequency of each OTA channel. Alternatively, in some embodiments, the processor module 312 may demodulate selected OTA channels and then re-modulate each OTA channel at a secondary frequency in the narrower secondary frequency spectrum. The processor module 312 may re-modulate each OTA channel using OTA channel modulation (e.g., 8VSB) or using satellite transponder modulation (e.g., QPSK, 8PSK).

The processor module 312 may pass the translated OTA channels to the multi-channel modulated output module 320. The multi-channel modulated output module 320 combines each of the translated OTA channels into a single stream, and outputs the channel stream to the combiner described in reference to FIG. 1.

The power management module 330 receives power from an external source, then conditions and distributes the power to the various modules and components of the OTA receiver 310. In some embodiments, the power management module 330 may receive power from receiving devices through a coaxial cable connection.

In some embodiments, the OTA receiver 310 further includes an antenna control module 315. The antenna control module 315 may allow the OTA receiver 310 to switch between multiple antennas 302 and/or steer one or more antennas 302. By switching and/or steering the antennas 302, the antenna control module 315 may optimize the antennas' reception of certain OTA channels in the OTA frequency spectrum. For example, the antenna control module 315 may switch to an antenna 302 that receives a stronger signal for one of the selected OTA channels.

In some embodiments, the OTA receiver 310 may include additional control circuitry and modules. For example, the OTA receiver 310 may include switchable filters, switchable low noise amplifiers (LNAs), and/or switchable line amplifiers. The switchable filters may reduce interference of the OTA channels received by the antennas 302. The switchable LNAs may increase the signal power of OTA channels received by the antenna 302. The line amplifiers may increase the signal power of the translated OTA channels transmitted by the multi-channel modulated output module 320.

Figure 4:
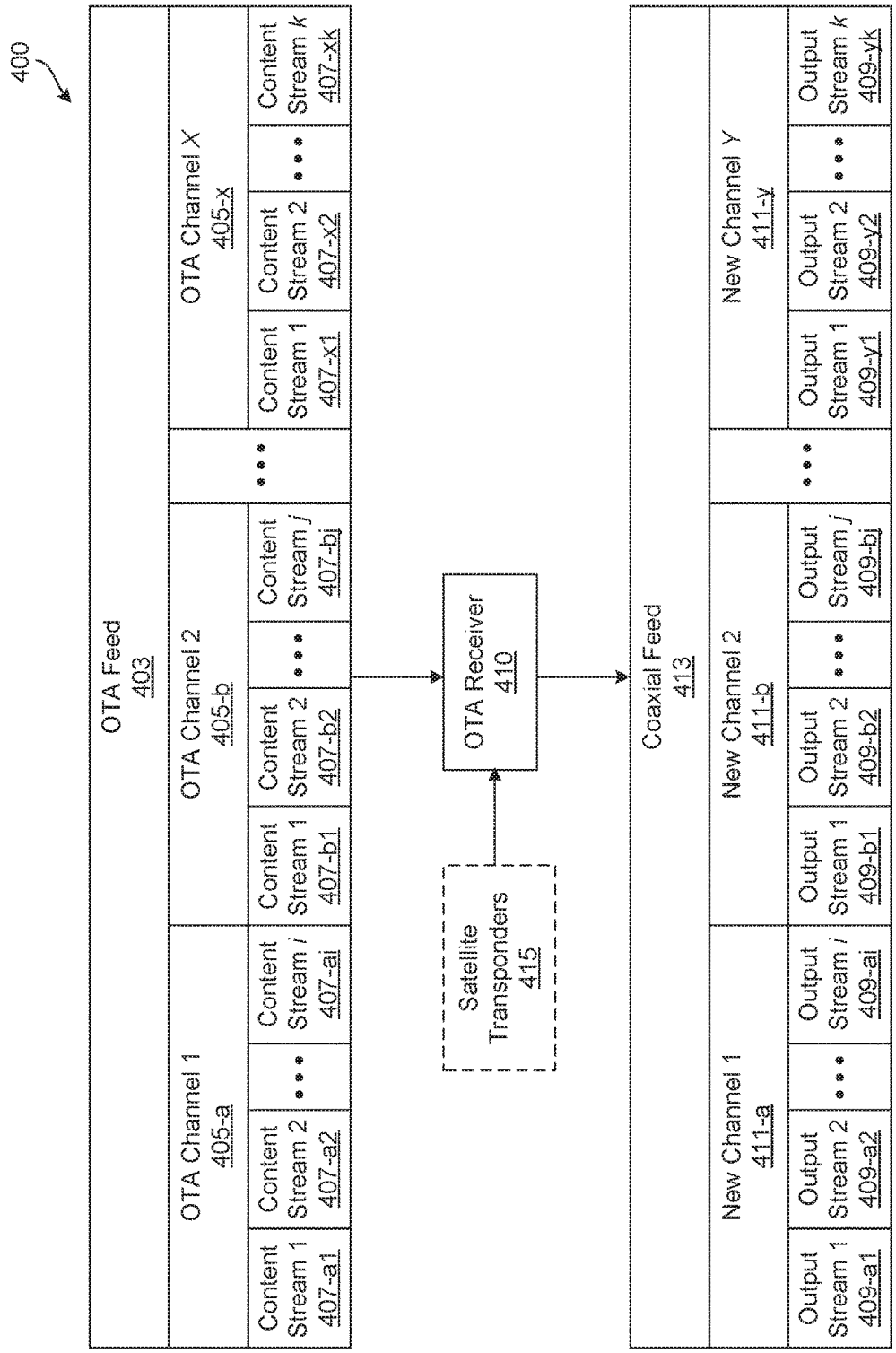
FIG. 4 is a diagram illustrating examples of OTA content streams repacked into new channels, according to one non-limiting illustrated embodiment.

In some embodiments, the content streams of the OTA channels may be repacked into new channels. FIG. 4 is a diagram illustrating examples of OTA content streams repacked into new channels, according to one non-limiting illustrated embodiment. An OTA feed 403 may be received by a OTA receiver 410 as described in reference to FIG. 1. The OTA receiver 410 may output a coaxial feed 413, which may be an example of the coaxial feed 113 described in reference to FIG. 1.

The OTA feed 403 includes a plurality of OTA channels 405a-405x. Each of the OTA channels 405a-405x corresponds to a broadcast frequency in the OTA frequency spectrum. In some embodiments, each of the OTA channels 405a-405x may include one or more content streams (e.g., channel 2-1 content stream, channel 2-2 content stream, etc.). As shown in FIG. 4, OTA channel 405a may include content streams 407a1-407ai, OTA channel 405b may include content streams 407b1-407bj, and OTA channel 405x may include content streams 407x1-407xk. It should be understood that the number of OTA channels 405 received by an OTA receiver, and the number of content streams 407 included in each OTA channel 405, may vary. For example, some OTA channels 405 may include one content stream 407, while other OTA channels 405 may include two or more content streams 407. Each of the different content streams 407 may correspond to video streams containing television programs from a broadcast network.

An OTA receiver 410 receives the OTA feed 403 from one or more antennas. The OTA receiver 410 may be an example of the OTA receiver 110 described in reference to FIG. 1. In various embodiments, the OTA receiver 410 may be a component of a receiving antenna (or LNBF), a standalone device, or a component of a receiving device (e.g., a set-top box). The OTA receiver 410 receives the OTA feed 403 and then demodulates selected OTA channels 405a-405x included in the OTA feed 403. The OTA channels 405a-405x may be selected based on which OTA channels are being tuned to by one or more of the receiving devices. Alternatively or in addition, the OTA channels may be selected based on a user's viewing history or other user preferences. The individual content streams 407 included in each OTA channel 405 may then be parsed and reassembled, as further described herein.

The OTA receiver 410 selects content streams 407 to be included in the coaxial feed 413, and parses the selected content streams 407 from their respective OTA channels 405. The content streams 407 may be selected based on user preferences or other predetermined criteria, such as which content streams are frequently viewed, bandwidth available in the coaxial feed, demodulating and processing capabilities of the receiving devices, and/or other criteria. The selected content streams 407 may then be assembled into output streams 409. The output streams 409 may include content streams 407 from one or more OTA channels 405. In some embodiments, the OTA receiver 410 may also demodulate, parse, and assemble content streams from one or more satellite transponders 415. The content streams from the satellite transponders 415 may be assembled with the content streams from one or more OTA channels 405. Alternatively, the satellite transponders may be demodulated and parsed by a combiner (not shown) or LNBF (not shown).

The OTA receiver may then modulate groups of output streams 409 into new coaxial channels 411. The new coaxial channels 411 may resemble typical OTA channels received by an antenna. In a preferred embodiment, the number of new coaxial channels 411 corresponds to a number of channels a receiving device is capable of tuning and demodulating. For example, each of the new coaxial channels 411 may correspond to a tuner/demodulator available in the receiving device. In some examples, the number of new coaxial channels 411 may be fewer than the number of OTA channels 405 originally received by the antenna of the OTA receiver 410. By decreasing the number of channels, the OTA content streams may share the bandwidth of the coaxial feed 413 with satellite transponder signals or other coaxial signals (such as MoCA signals) without causing significant interference. Furthermore, the content streams included in the coaxial feed 413 may be more relevant to a user. The OTA receiver 410 may add each of the new coaxial channels to a channel stack to create the coaxial feed 413. In some embodiments, the channel stack may include the new coaxial channels 411 as well as stacked satellite transponders 415. The channel stack may efficiently use the bandwidth available for the coaxial feed 413.

Figure 5A:
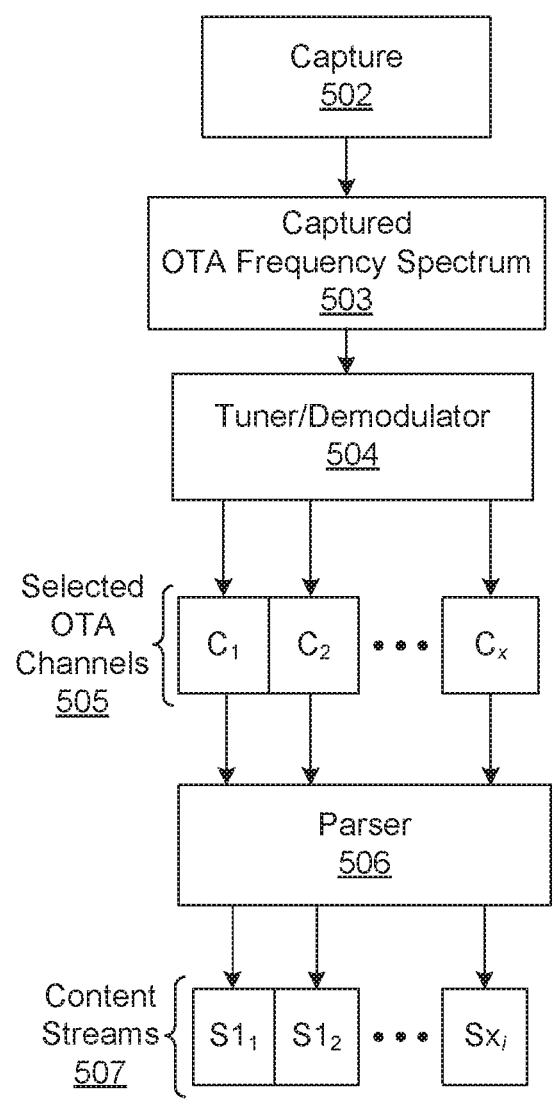
FIG. 5A is a diagram illustrating an example of a content stream parsing OTA receiver 500, according to one non-limiting embodiment.

FIG. 5A is a diagram illustrating an example of a content stream parsing OTA receiver 500, according to one non-limiting embodiment. The OTA receiver 500 may be an example of the OTA receivers 110, 310, 410 described in reference to FIGS. 1, 3, and 4.

The OTA receiver 500 includes a capture module 502. The capture module 502 receives an OTA feed from one or more antennas, as described in reference to FIGS. 1-4. The capture module 502 captures the full frequency spectrum received by one or more antennas. The capture module 502 may perform analog to digital conversion of the full frequency spectrum. Alternatively, the capture module 502 may utilize a bank of tuner/demodulators tuned to each frequency band of the frequency spectrum being captured. The capture module 502 may operate in parallel with other capture modules (not shown) to capture multiple OTA feeds approximately simultaneously. Alternatively, in some embodiments, a single capture module 502 may be capable of capturing multiple OTA feeds approximately simultaneously.

A tuner/demodulator module 504 tunes to selected OTA channels in the captured OTA frequency spectrum 503, then demodulates the selected OTA channels and outputs baseband OTA channels 505. The tuner/demodulator module 504 may include multiple tuner/demodulators to tune and demodulate multiple selected OTA channels simultaneously.

A parser module 506 then parses content streams 507 from each of the selected OTA channels 505. The parser module 506 may parse the content streams 507 from each respective OTA channel 505. The content streams 507 may correspond to video streams containing television programs from broadcast television networks.

FIG. 5B is a continuation of the example OTA receiver 500 shown in FIG. 5A, according to one non-limiting illustrated embodiment. A stream assembler 508 takes each of the content streams 507 and reassembles them into new transport streams 509. The number of new transport streams 509 may be fewer than the number of OTA channels captured by the capture module 502. In a preferred embodiment, the number of new transport streams 509 corresponds to a number of channels a receiving device is capable of simultaneously tuning and demodulating.

Each of the new transport streams 509 may include one or more content streams 507 from the selected OTA channels 505. For example, new input stream $NT_1$ may include content stream $S1_1$ from OTA channel $C_1$. The content streams 507 may be selected for the new transport streams 509 based on user preferences or other predetermined criteria, such as which video streams are frequently viewed, bandwidth available in the coaxial feed, demodulating and processing capabilities of the receiving device, and/or other criteria.

The new transport streams 509 may include the same or different numbers of content streams as the original OTA channels 505. In some examples, one or more of the new transport streams 509 may include the same content streams (e.g., $S1_1$-$S1_j$) as one or more of the original OTA channels 505.

RF modulators 510a-510y then modulate the new transport streams 509 to generate new coaxial channels 511. The new transport streams 509 may be modulated so that they resemble typical OTA channels received from an antenna, while occupying a narrower total frequency spectrum. Each of the new coaxial channels 511 may correspond to a tuner/demodulator available in the receiving device. In some examples, the number of new coaxial channels 511 may be fewer than the number of OTA channels in the OTA frequency spectrum originally received by the antenna of the OTA receiver 500.

A channel stacker 512 then adds each of the new coaxial channels 511 to a channel stack to create a coaxial feed 513. In some examples, the channel stacker 512 may also add satellite transponder signals 515 to the channel stack. The coaxial feed 513 may be an example of the coaxial feeds 113, 413 described in reference to FIGS. 1 and 4. The stacked new coaxial channels 511 may more efficiently use the bandwidth available for the coaxial feed 513. A transmitter may transmit the coaxial feed 513 to a receiving device.

The receiving device may utilize tuner/demodulators, as further described herein, in order to receive and process the coaxial feed 513. By including new coaxial channels 511 in the coaxial feed 313 that utilize a narrower frequency spectrum, the coaxial feed 513 may carry both OTA channels and satellite transponder signals with less or no overlap in their frequency bands.

In some embodiments, the RF modulators 510a-510y may modulate the new transport streams 509 to resemble satellite transponder signals. For example, the RF modulators 510a-510y may modulate the new transport streams 509 as 8PSK Turbo coded satellite transponders. These new satellite transponders may be added to an open frequency band within the existing satellite frequency spectrum. The receiving device(s) (e.g., set-top box) may then utilize satellite tuner/demodulators to extract the OTA content streams. This may eliminate the need for OTA tuner/demodulators in the receiving device(s).

Figure 5C:
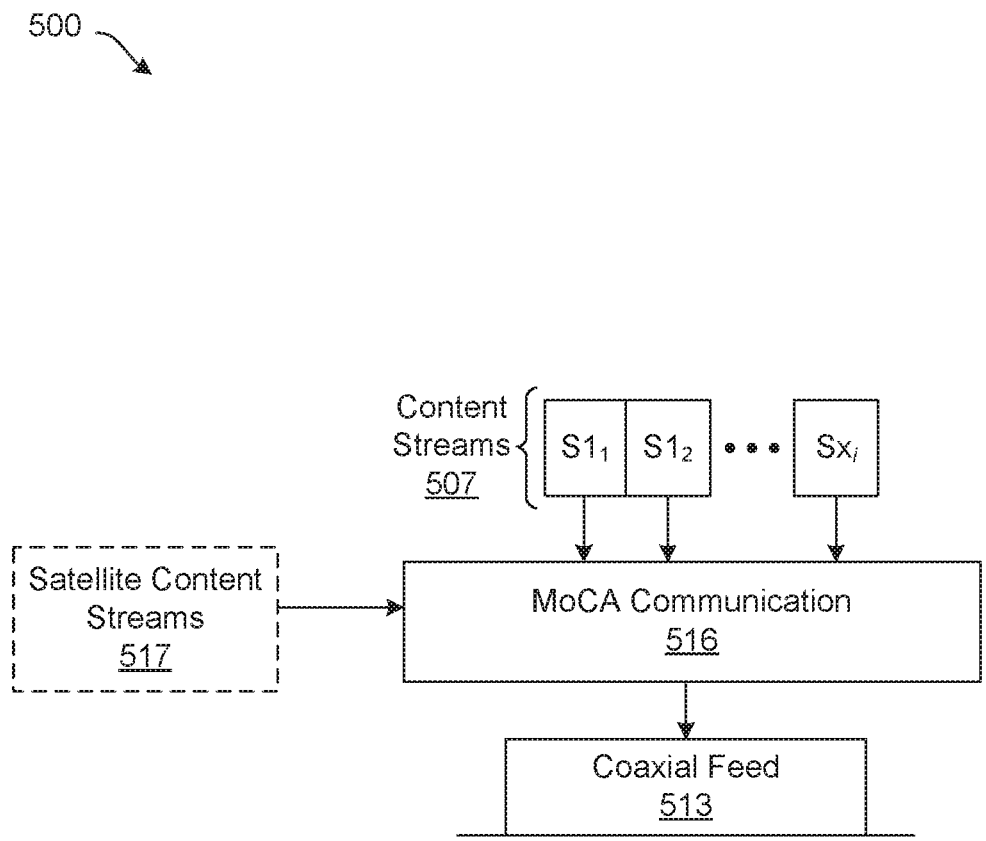
FIG. 5C is an alternative continuation of the example OTA receiver shown in FIG. 5A, according to one non-limiting illustrated embodiment.

FIG. 5C is an alternative continuation of the example OTA receiver 500 shown in FIG. 5A, according to one non-limiting illustrated embodiment. A MoCA communication module 516 takes each of the content streams 507 and transmits them over the coaxial feed 513 as MoCA signals. In some examples, the MoCA communication module 516 may also add satellite content streams 517 to the coaxial feed as MoCA signals. The satellite content streams 517 may be parsed from satellite transponder signals by the OTA receiver 500, by the LNBF of a receiver antenna, or by a separate satellite capture device.

The MoCA communication module 516 may transmit the content streams 507 (and satellite content streams 517) over the coaxial feed 513 as Internet Protocol (IP) packets. The coaxial feed 513 may be an example of the coaxial feeds 113, 413 described in reference to FIGS. 1 and 4. A receiving device (such as a set-top box) may include a MoCA radio to receive and process the MoCA signals from the OTA receiver 500. The MoCA signals may transmitted over a designated MoCA network band of the coaxial feed 513, which may allow the MoCA signals to avoid interfering with satellite transponder frequency bands or other coaxial frequency bands. In some embodiments, the receiving device may exclude satellite and OTA tuner/demodulators, and instead may use the MoCA radio to receive satellite and OTA content streams. Furthermore, the receiving device may transmit MoCA signals to the OTA receiver 500 to communicate which OTA content streams (and satellite content streams 517) the OTA receiver 500 should transmit.

Figure 6:
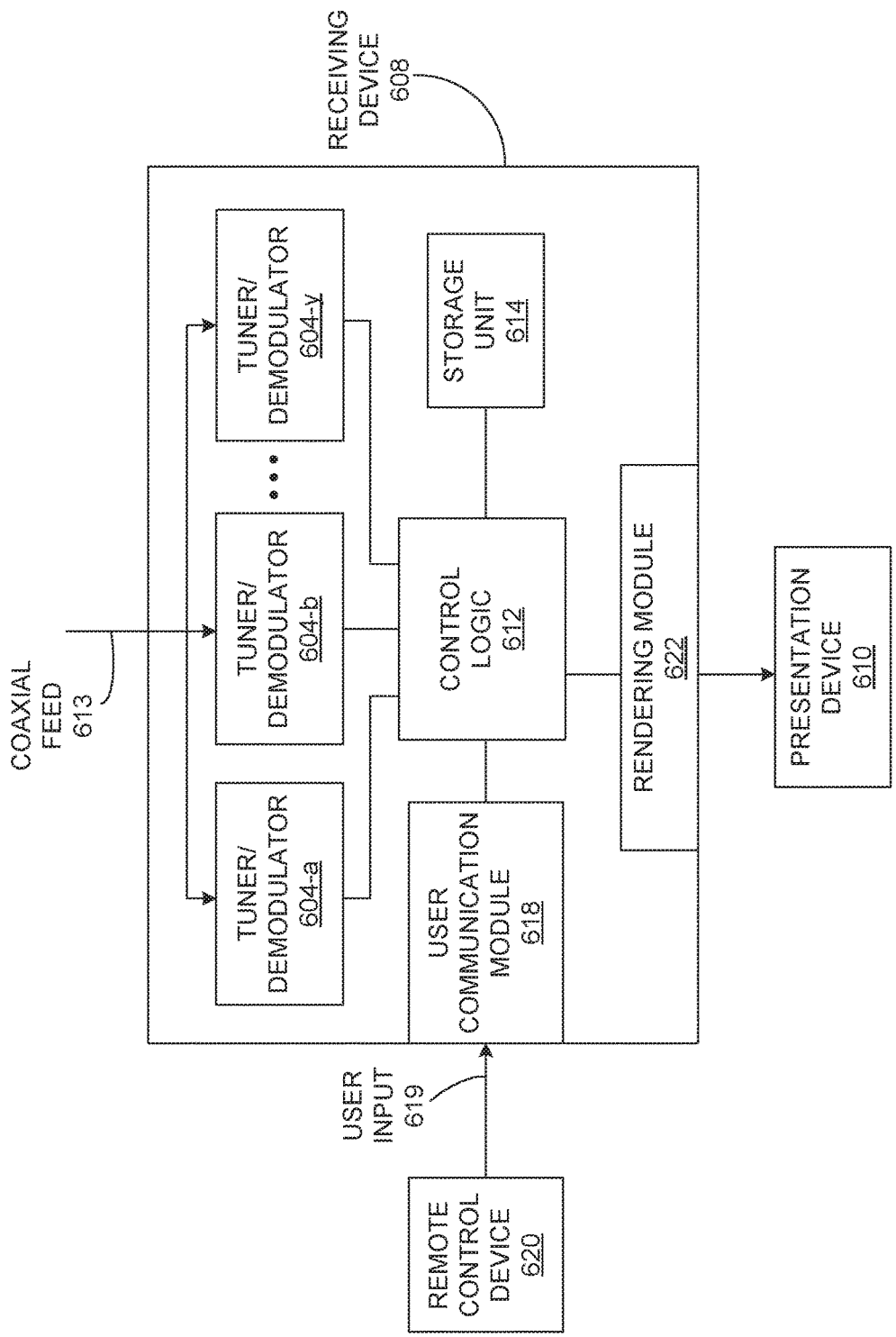
FIG. 6 illustrates an example of a receiving device, according to one non-limiting illustrated embodiment.

FIG. 6 illustrates an example of a receiving device 608, according to one non-limiting illustrated embodiment. The receiving device 608 may be an example of one or more of the receiving devices 108a-108m described in reference to FIG. 1.

The receiving device 608 includes one or more tuner/demodulators 604a-604y. Each tuner/demodulator 604a-604y may tune and process one or more channels and/or transponder signals from a coaxial feed 613. While shown as individual tuner/demodulators 604a-604y, the receiving device 608 may include one or more wideband tuner/demodulators, each capable of tuning and demodulating multiple channels and/or transponders from the coaxial feed 613. The coaxial feed 613 may be an example of the coaxial feeds 113, 413, 513 described in reference to FIGS. 1, 4, and 5. One or more of the channels and/or transponder signals included in the coaxial feed 613 may correspond to a new coaxial channel assembled by an OTA receiver, as described in reference to FIGS. 1-5. Each new coaxial channel may represent a distinct frequency sub-band, as modulated by the OTA receiver. The new coaxial channels may resemble typical OTA channels received by an antenna, or typical transponder signals received from a satellite. The number of new coaxial channels and/or transponder signals included in the coaxial feed 613 may correspond to the number of tuner/demodulators 604a-604y in the receiving device 614.

The tuner/demodulators 604a-604y may tune to a particular channel or transponder as part of the process of a user selecting a certain content stream for viewing on a presentation device 610. A control logic 612 may identify which channel or transponder of the coaxial feed 613 includes a selected content stream and instruct the corresponding tuner/demodulator to tune and demodulate the channel or transponder. The control logic 612 may identify which channel or transponder should be tuned and demodulated based on a mapping of content streams to channels and transponders. The mapping of OTA channels to new coaxial channels may be transmitted and stored in the OTA receiver. Once a channel or transponder signal has been tuned and demodulated, the control logic 612 may extract the selected content stream.

One or more storage units 614 may be included internal and/or external to the receiving device 608. The storage unit 614 may store recorded content streams and/or other control or informational data, such as the channel and/or transponder mapping. The control logic 612 may coordinate the storage and retrieval of content streams or other data to/from the storage unit 614.

The receiving device 608 may also include a user communication module 618 and a rendering module 622. The user communication module 618 receives user input 619 from a remote control device 620. The rendering module 622 renders a content stream into a presentable format for the presentation device 610. The control logic 612 may coordinate the output of a video stream to the rendering module 622. Furthermore, the receiving device 608 may include other components, modules, elements, or devices not illustrated for the sake of brevity.

Figure 7:
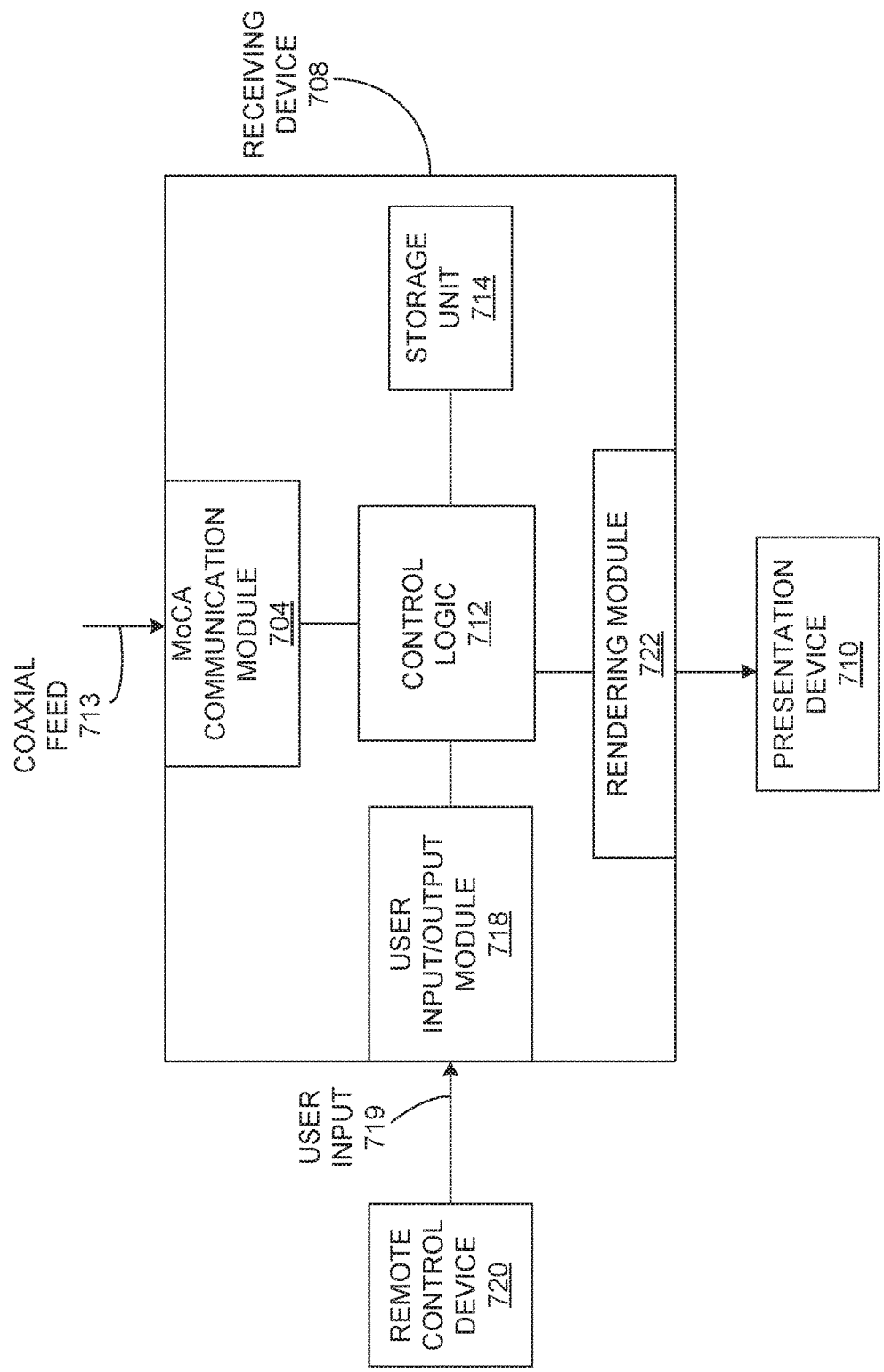
FIG. 7 illustrates an example of a receiving device for receiving MoCA signals, according to one non-limiting illustrated embodiment.

FIG. 7 illustrates an example of a receiving device 708 for receiving MoCA signals, according to one non-limiting illustrated embodiment. The receiving device 708 may be an example of one or more of the receiving devices 108a-108m described in reference to FIG. 1.

The receiving device 708 includes a MoCA communication module 704 for receiving MoCA signals from a coaxial feed 713. The coaxial feed 713 may be an example of the coaxial feeds 113, 413, 513 described in reference to FIGS. 1, 4 and 5. The MoCA signals included in the coaxial feed 713 may correspond to MoCA signals transmitted by an OTA receiver 500, as described in reference to FIG. 5C.

The receiving device 708 extracts content streams from the coaxial feed 713 as part of the process of a user selecting a certain video stream for viewing on a presentation device 710. A control logic 712 may receive the extracted content streams and may further process the content stream into a video stream for rendering by a rendering module 722 into a presentable format for the presentation device 710.

One or more storage units 714 may be included internal and/or external to the receiving device 708. The storage unit 714 may store recorded video streams and/or other control or informational data. The control logic 712 may coordinate the storage and retrieval of video streams or other data to/from the storage unit 714.

The receiving device 708 may also include a user communication module 718. The user communication module 718 receives user input 719 from a remote control device 720. Furthermore, the receiving device 708 may include other components, modules, elements, or devices not illustrated for the sake of brevity.

Figure 8:
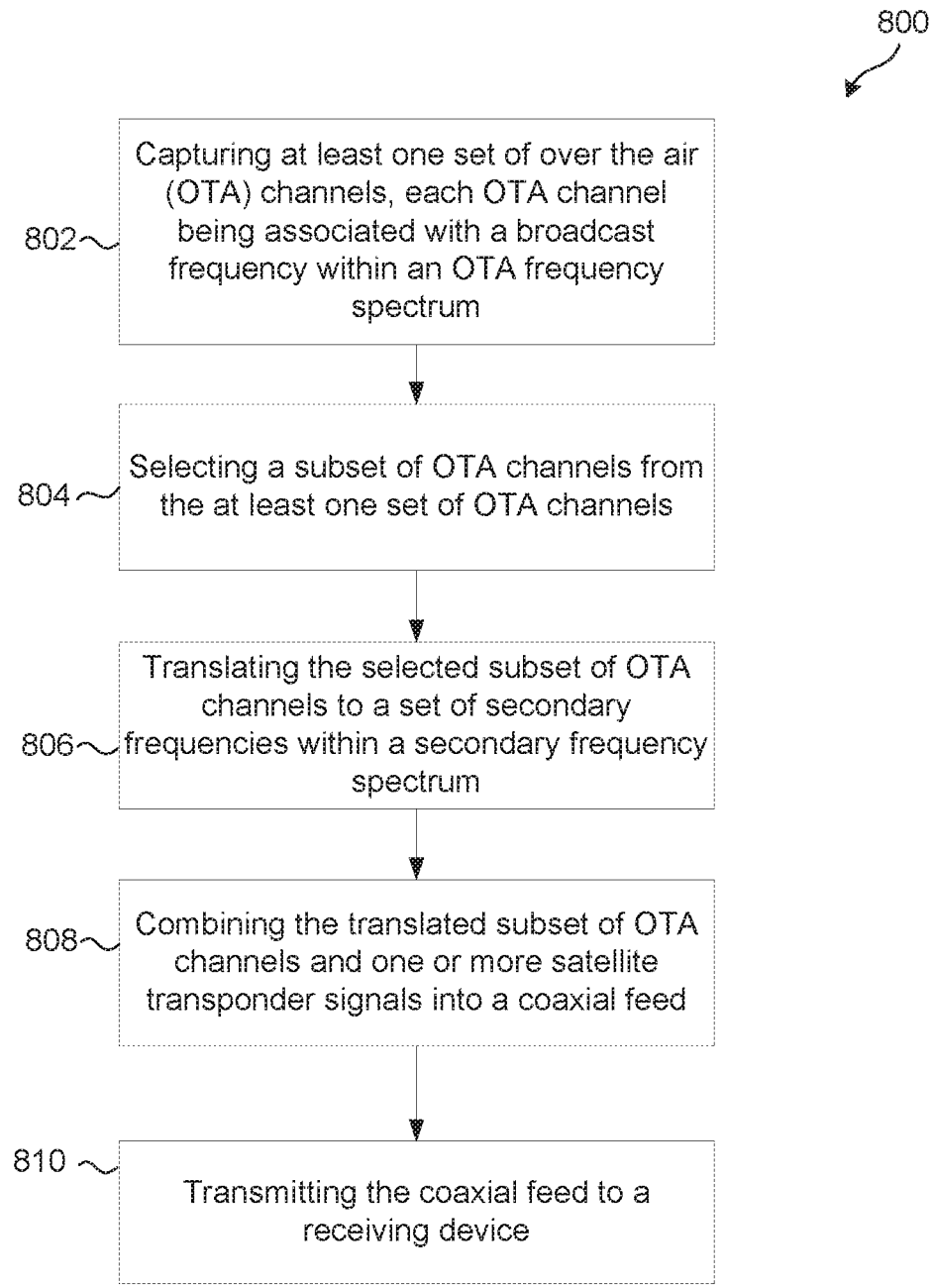
FIG. 8 is a flow diagram showing a method for modifying OTA channels, according to one non-limiting illustrated embodiment.

FIG. 8 is a flow diagram showing a method 800 for modifying OTA channels, according to one non-limiting illustrated embodiment. The method 800 may be performed by an OTA receiver and/or combiner device, such as the OTA receiver and/or combiner described in reference to FIGS. 1-5. The OTA receiver and/or combiner may be a component of the receiving antenna, a component of a receiving device, or a standalone device(s).

At step 802, the method 800 includes capturing at least one set of OTA channels. Each OTA channel in the set of OTA channels is associated with a broadcast frequency within an OTA frequency spectrum.

At step 804, the method 800 includes selecting a subset of OTA channels from the at least one set of OTA channels. The subset of OTA channels may be selected based at least in part on one or more active OTA tuners in the receiving device. In some embodiments, the method 800 may further include storing a correspondence between the broadcast frequency and the secondary frequency for each selected OTA channel.

In some embodiments, the method 800 may also include measuring channel quality of the selected subset of OTA channels modifying at least one of antenna selection and antenna steering based on the measured channel quality.

At step 806, the method 800 includes translating the selected subset of OTA channels to a set of secondary frequencies within a secondary frequency spectrum. In some embodiments, the selected subset of OTA channels may be translated by shifting the broadcast frequency of each selected OTA channel to its respective secondary frequency. Alternatively or in addition, in some embodiments, the selected subset of OTA channels may be translated by demodulating each selected OTA channel and modulating each demodulated OTA channel based on its respective secondary frequency. The secondary frequency spectrum may have a bandwidth narrower than the OTA frequency spectrum. In some embodiments, the secondary frequency spectrum may include at least one satellite transponder frequency.

In some embodiments, the selected subset of OTA channels may be translated by demodulating each selected OTA channel, parsing one or more content streams from the selected subset of OTA channels, assembling at least one new transport stream from the one or more content streams, and modulating the at least one new transport stream based on its respective secondary frequency to generate at least one new channel.

At step 808, the method 800 includes combining the translated subset of OTA channels and one or more satellite transponder signals into a coaxial feed.

At step 810, the method 800 includes transmitting the coaxial feed to a receiving device.

The method 800 may include additional acts, omit some acts, and/or may perform the acts in a different order than set out in the FIG. 8.

Figure 9:
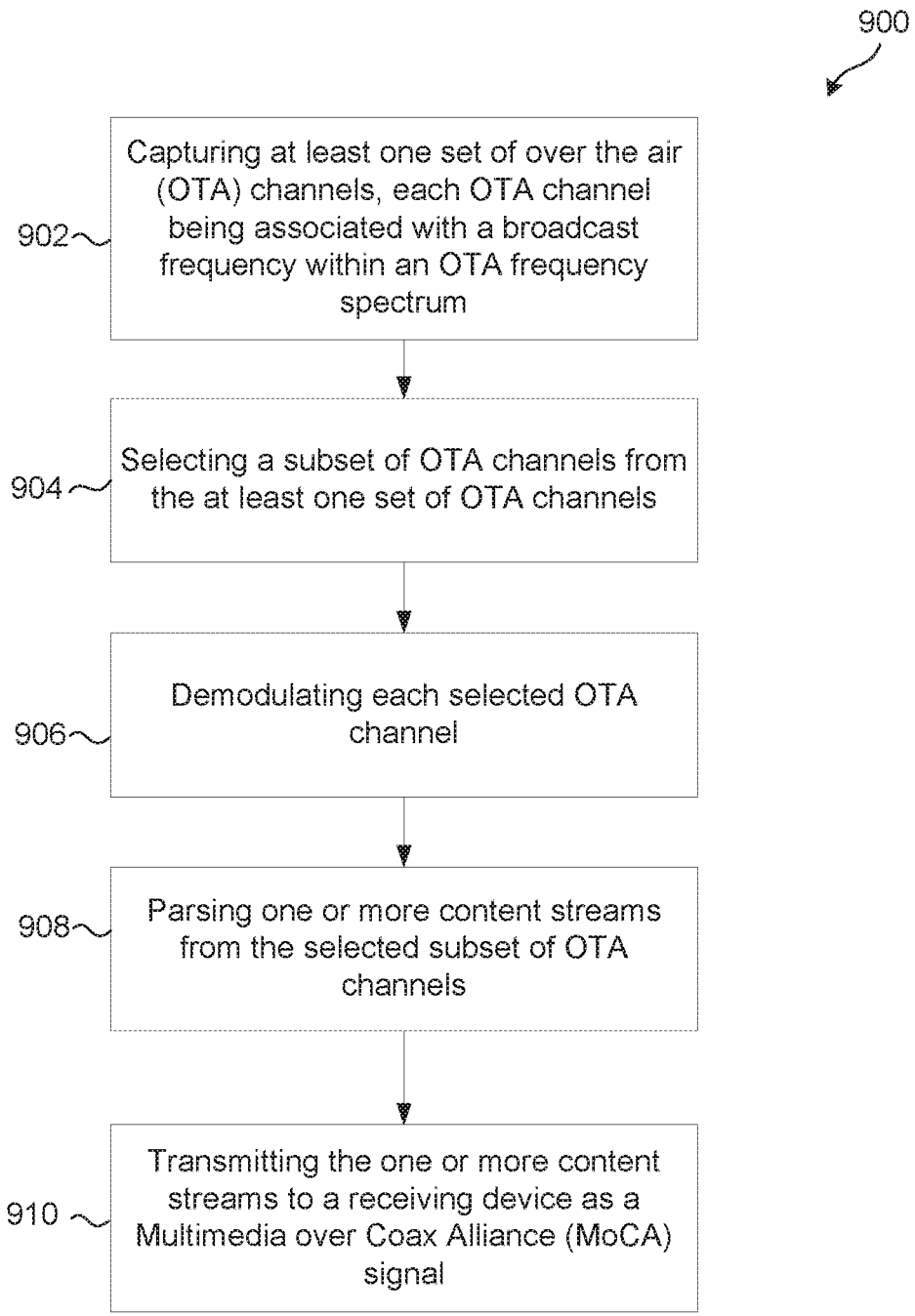
FIG. 9 is a flow diagram showing a method for modifying OTA channels, according to one non-limiting illustrated embodiment.

FIG. 9 is a flow diagram showing a method 900 for modifying OTA channels, according to one non-limiting illustrated embodiment. The method 900 may be performed by an OTA receiver and/or combiner device, such as the OTA receiver and/or combiner described in reference to FIGS. 1-5. The OTA receiver and/or combiner may be a component of the receiving antenna, a component of a receiving device, or a standalone device(s).

At step 902, the method 900 includes capturing at least one set of OTA channels. Each OTA channel in the captured set of OTA channels is associated with a broadcast frequency within an OTA frequency spectrum.

At step 904, the method 900 includes selecting a subset of OTA channels from the at least one set of OTA channels.

At step 906, the method 900 includes demodulating each selected OTA channel.

At step 908, the method 900 includes parsing one or more content streams from the selected subset of OTA channels.

At step 910, the method 900 includes transmitting the one or more content streams to a receiving device as a MoCA signal.

In some embodiments, the method 900 may further include parsing one or more satellite streams from a satellite transponder, combining the one or more content streams from the subset of OTA channels and the one or more satellite streams into a unified stream, and transmitting the unified stream as a MoCA signal to the receiving device.

The method 900 may include additional acts, omit some acts, and/or may perform the acts in a different order than set out in the FIG. 9.

The foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that many functions and/or operations within such block diagrams (e.g., the functions of the stream packer or stream packing apparatus), flowcharts, or examples can be implemented, individually and/or collectively, by a wide range of hardware, software, firmware, or virtually any combination thereof and that designing the circuitry and/or writing the code for the software and/or firmware would be well within the skill of one of ordinary skill in the art in light of the teachings of this disclosure. For example, the functions of the stream packer could be implemented in discrete logic with no central processing unit (CPU) or software involvement.

When logic is implemented as software and stored in memory, logic or information can be stored on any non-transitory computer-readable medium for use by or in connection with any processor-related system or method. In the context of this disclosure, a memory is a nontransitory computer- or processor-readable storage medium that is an electronic, magnetic, optical, or other physical device or means that non-transitorily contains or stores a computer and/or processor program. Logic and/or the information can be embodied in any computer-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "computer-readable medium" can be any physical element that can store the program associated with logic and/or information for use by or in connection with the instruction execution system (e.g., the control logic 412), apparatus, and/or device. The computer-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), and digital tape.

The various embodiments described above can be combined to provide further embodiments. Aspects of the embodiments can be modified, if necessary, to employ systems, circuits and concepts of the various patents, applications and publications to provide yet further embodiments.

The above description of illustrated embodiments, including what is described in the Abstract, is not intended to be exhaustive or to limit the embodiments to the precise forms disclosed. Although specific embodiments and examples are described herein for illustrative purposes, various equivalent modifications can be made without departing from the spirit and scope of the disclosure, as will be recognized by those skilled in the relevant art.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A method, comprising:
   receiving one or more satellite transponder signals;
   capturing at least one set of over the air (OTA) channels, each OTA channel being associated with a broadcast frequency within an OTA frequency spectrum;
   selecting a subset of OTA channels from the at least one set of OTA channels;
   translating the selected subset of OTA channels to a set of secondary frequencies within a secondary frequency spectrum, wherein the secondary frequency spectrum has a bandwidth narrower than the OTA frequency spectrum;
   combining the translated subset of OTA channels and the one or more satellite transponder signals into a coaxial feed, the set of OTA channels being different from the one or more satellite transponder signals, the one or more satellite transponder signals associated with frequencies within a satellite frequency spectrum, wherein the translated subset of OTA channels is added to a frequency band within the satellite frequency spectrum of the received one or more satellite transponder signals;
   transmitting the coaxial feed to a receiving device; and
   storing a correspondence between the broadcast frequency and the secondary frequency for each selected OTA channel.

2. The method of claim 1, wherein translating the selected subset of OTA channels comprises:
   shifting the broadcast frequency of each selected OTA channel to its respective secondary frequency.

3. The method of claim 1, wherein translating the selected subset of OTA channels comprises:
   demodulating each selected OTA channel; and
   modulating each demodulated OTA channel based on its respective secondary frequency.

4. The method of claim 1, wherein translating the selected subset of OTA channels comprises:
   demodulating each selected OTA channel; and
   modulating each demodulated OTA channel using satellite transponder modulation.

5. The method of claim 1, wherein translating the selected subset of OTA channels comprises:
   demodulating each selected OTA channel;
   parsing one or more content streams from the selected subset of OTA channels;
   assembling at least one new transport stream from the one or more content streams; and
   modulating the at least one new transport stream based on its respective secondary frequency to generate at least one new channel.

6. The method of claim 1, further comprising:
   selecting the subset of OTA channels based at least in part on one or more active OTA tuners in the receiving device.

7. The method of claim 1, further comprising:
   measuring channel quality of the selected subset of OTA channels; and
   modifying at least one of antenna selection and antenna steering based on the measured channel quality.

8. A computer-readable storage medium storing computer-readable instructions, comprising:
   instructions for receiving one or more satellite transponder signals;
   instructions for capturing at least one set of over the air (OTA) channels, each OTA channel being associated with a broadcast frequency within an OTA frequency spectrum;
   instructions for selecting a subset of OTA channels from the at least one set of OTA channels;
   instructions for demodulating each selected OTA channel;
   instructions for parsing one or more content streams from the selected subset of OTA channels;
   instructions for modulating each demodulated OTA channel based on its respective secondary frequency, wherein the subset of OTA channels are modulated to a set of secondary frequencies within a secondary frequency spectrum, wherein the secondary frequency spectrum has a bandwidth narrower than the OTA frequency spectrum; and
   instructions for combining the translated subset of OTA channels with the one or more satellite transponder signals into a coaxial feed, the set of OTA channels being different from the one or more satellite transponder signals, the one or more satellite transponder signals associated with frequencies within a satellite frequency spectrum, wherein the translated subset of OTA channels is added to a frequency band within the satellite frequency spectrum of the received one or more satellite transponder signals;
   instructions for transmitting the coaxial feed to a receiving device; and
   instructions for storing a correspondence between the broadcast frequency and the secondary frequency for each selected OTA channel.

9. The computer-readable storage medium of claim 8, wherein the instructions for combining include:
   instructions for parsing one or more satellite streams from a satellite transponder;
   instructions for combining the one or more content streams from the subset of OTA channels and the one or more satellite streams into a unified stream; and
   instructions for transmitting the unified stream as a MoCA signal to a receiving device.

10. An over-the-air (OTA) receiving system, comprising:
    a capture module for capturing at least one set of OTA channels, each OTA channel being associated with a broadcast frequency within an OTA frequency spectrum;
    a selection module for selecting a subset of OTA channels from the at least one set of OTA channels;
    a translation module for translating the selected subset of OTA channels to a set of secondary frequencies within a secondary frequency spectrum, wherein the secondary frequency spectrum has a bandwidth narrower than the OTA frequency spectrum;

a combiner module for combining the translated subset of OTA channels and one or more satellite transponder signals into a coaxial feed, the set of OTA channels being different from the one or more satellite transponder signals, the one or more satellite transponder signals associated with frequencies within a satellite frequency spectrum, wherein the translated subset of OTA channels is added to a frequency band within the satellite frequency spectrum of the one or more satellite transponder signals;

a communications module for transmitting the coaxial feed to a receiving device; and a storage unit for storing a correspondence between the broadcast frequency and the secondary frequency for each selected OTA channel.

11. The system of claim 10, wherein translating the selected subset of OTA channels comprises:
shifting the broadcast frequency of each selected OTA channel to its respective secondary frequency.

12. The system of claim 10, wherein translating the selected subset of OTA channels comprises:
demodulating each selected OTA channel; and
modulating each demodulated OTA channel based on its respective secondary frequency.

13. The system of claim 10, wherein translating the selected subset of OTA channels comprises:
demodulating each selected OTA channel; and
modulating each demodulated OTA channel using satellite transponder modulation.

14. The system of claim 10, wherein translating the selected subset of OTA channels comprises:
demodulating each selected OTA channel;
parsing one or more content streams from the selected subset of OTA channels;
assembling at least one new transport stream from the one or more content streams; and
modulating the at least one new transport stream based on its respective secondary frequency to generate at least one new channel.

15. The system of claim 10, wherein the selection module selects the subset of OTA channels based at least in part on one or more active OTA tuners in the receiving device.

16. The system of claim 10, further comprising:
a measurement module for measuring channel quality of the selected subset of OTA channels; and
an antenna control module for modifying at least one of antenna selection and antenna steering based on the measured channel quality.

17. The computer-readable storage medium of claim 8, wherein the instructions for parsing further include:
instructions for transmitting the one or more content streams to a receiving device as a Multimedia over Coax Alliance (MoCA) signal.

* * * * *